United States Patent

Valbonesi

[15] 3,665,125

[45] May 23, 1972

[54] REPEATER WITH BIAS-COMPENSATING MEANS

[72] Inventor: Giuseppe Valbonesi, Milan, Italy

[73] Assignee: Societa Italiana Telecommunicazioni Siemens S.p.A., Milan, Italy

[22] Filed: June 17, 1970

[21] Appl. No.: 46,993

[30] Foreign Application Priority Data

June 18, 1969 Italy ..............................18,319 A/69

[52] U.S. Cl. ..........................................179/170 R, 333/27

[51] Int. Cl. ........................................H04b 3/36, H03f 3/62

[58] Field of Search ....................179/170 R, 170 T; 333/27; 330/26, 195

[56] References Cited

UNITED STATES PATENTS

| | | | |
|---|---|---|---|
| 2,849,610 | 8/1958 | Umback | 179/170 R |
| 1,809,879 | 6/1931 | Whittle | 330/195 |

*Primary Examiner*—Kathleen H. Claffy
*Assistant Examiner*—William A. Helvestine
*Attorney*—Karl F. Ross

[57] ABSTRACT

A telephone repeater at the junction of two reactively interconnected line segments, one of them a DC circuit with a predominantly inductive termination including a split coil on a core, comprises a transistor with a base/emitter circuit connected across a resistor forming part of this termination and with a compensating inductance in series with its collector wound on the same core in opposing relationship with the coil.

9 Claims, 9 Drawing Figures

Figure 1A:
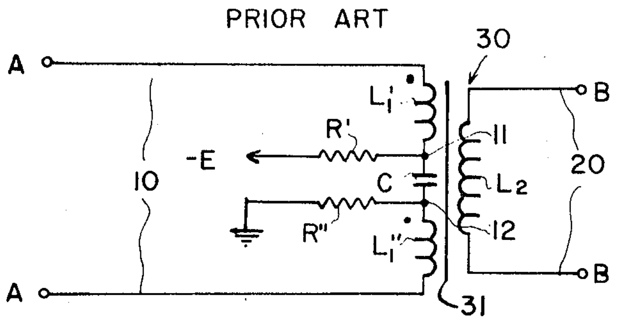

Giuseppe Valbonesi
*INVENTOR*

BY Karl G. Ross

*Attorney*

INVENTOR.
Giuseppe Valbonesi
BY
Karl F. Ross
Attorney

REPEATER WITH BIAS-COMPENSATING MEANS

My present invention relates to a signal-amplifying system such as, for example, a repeater used in telephone and other telecommunication circuits.

For the transmission of switching signals from, say, a telephone subscriber to a central office and the relaying of voice frequencies to another station therebeyond, two line segments may be reactively coupled in a manner blocking the retransmission of the DC switching signals to the remote station while minimizing the attenuation of the voice frequencies at the junction of the two circuits. For this purpose it is customary to terminate the incoming line segment in a predominantly inductive network and to provide either capacitive or transformer coupling between that network and the outgoing line segment, the incoming line segment generally including a source of direct current which normally serves for the generation of switching signals but which may also be used to energize a transistor acting as a signal amplifier. Since, during voice-frequency transmission, the amplifying transistor must normally conduct along a linear part of its characteristic in order to prevent distortion, direct current will flow through the incoming line segment whenever that circuit is closed. This current premagnetizes the core of the transformer or choke windings of the terminal network so that, in order to prevent their saturation, the cores must be provided with air gaps and/or made of large cross section.

The general object of my invention is to provide an improved signal-amplifying system adapted to use relatively small cores, without air gaps, so as to be less costly and more compact than conventional systems of this character.

More specifically, my invention aims at providing a repeater in which the biasing effect of a direct current, drawn for example from a central battery of a telephone exchange, is neutralized by a compensatory current flow through a winding on the same core.

In accordance with this invention, a transistor (or combination of transistors) having input electrodes connected across all or part of a resistive branch of an otherwise mainly inductive terminal network is connected in series with a compensating winding carried on the same core as the choke or transformer windings of the network but in opposed relationship therewith.

These choke or transformer windings, hereinafter referred to as the primary inductance, may be in the form of a coil split into two generally symmetrical halves between which the transistor is inserted in series with the DC source. The halves of the primary inductance are advantageously separated by a capacitor (or combination of capacitors) serving as a bypass for transients and higher harmonics so that the transistor responds only to frequencies within the voice band to be transmitted.

Figure 1B:
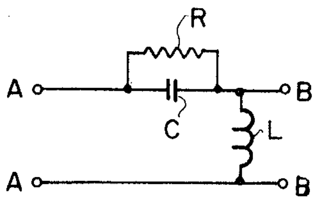

The invention will be described in greater detail hereinafter with reference to the accompanying drawing in which:

FIG. 1*a* shows a prior-art coupling network between a subscriber line and an outgoing line;

FIG. 1*b* is an equivalent circuit diagram for the network of FIG. 1*a;*

Figure 2A:
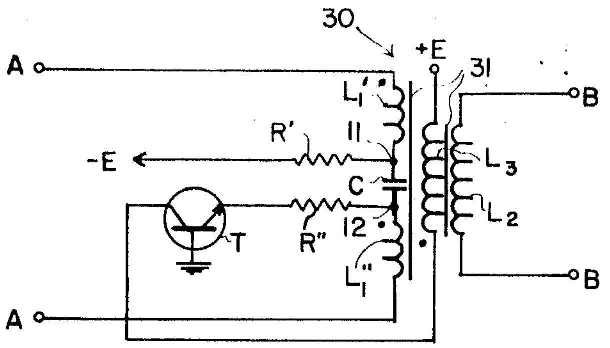
Figure 2B:
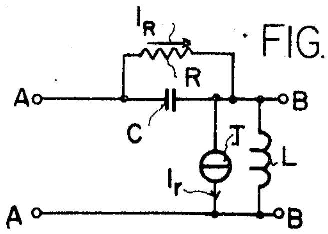

FIG. 2*a* shows a repeater with bias-compensating means according to the invention;

FIG. 2*b* is an equivalent circuit diagram for the repeater of FIG. 2*a;*

Figure 2C:
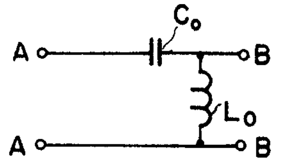

FIG. 2*c* is a simplification of the diagram of FIG. 2*b;*

Figure 3:
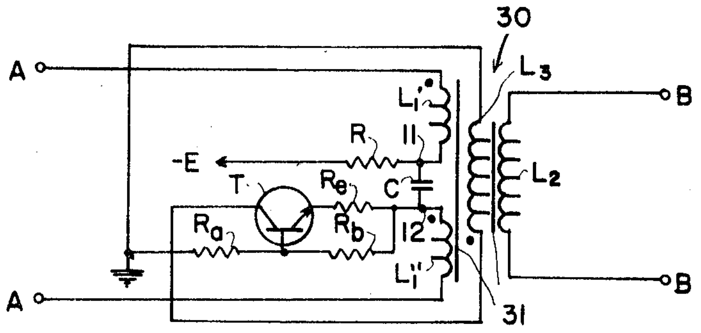
Figure 4A:
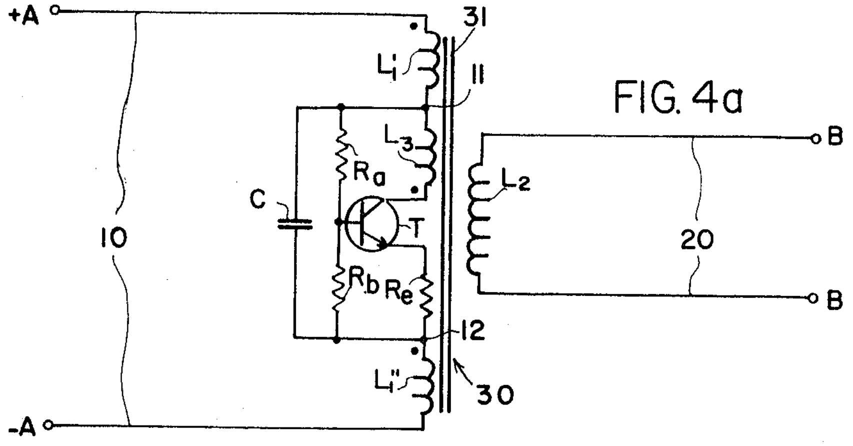
Figure 4B:
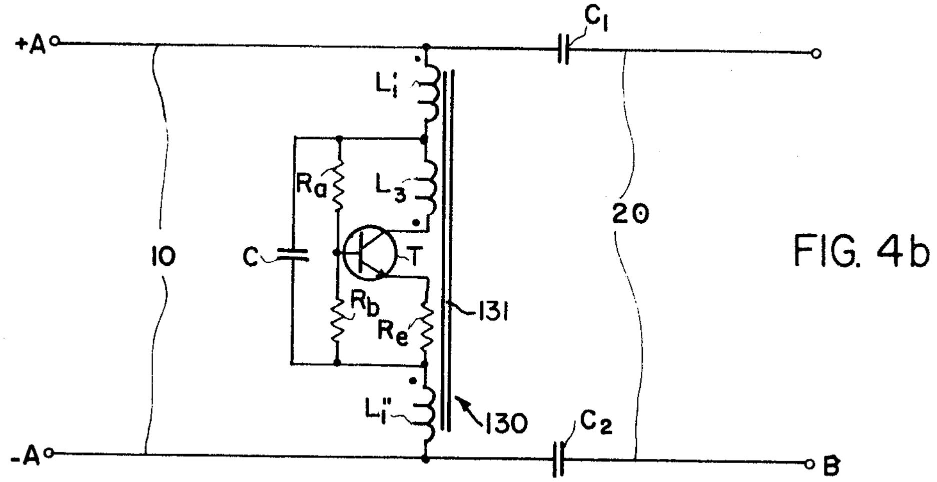

FIG. 3 is a view similar to FIG. 2*a*, showing an alternate embodiment;

FIGS. 4*a* and 4*b* illustrate modifications of the system of FIG. 3; and

Figure 4C:
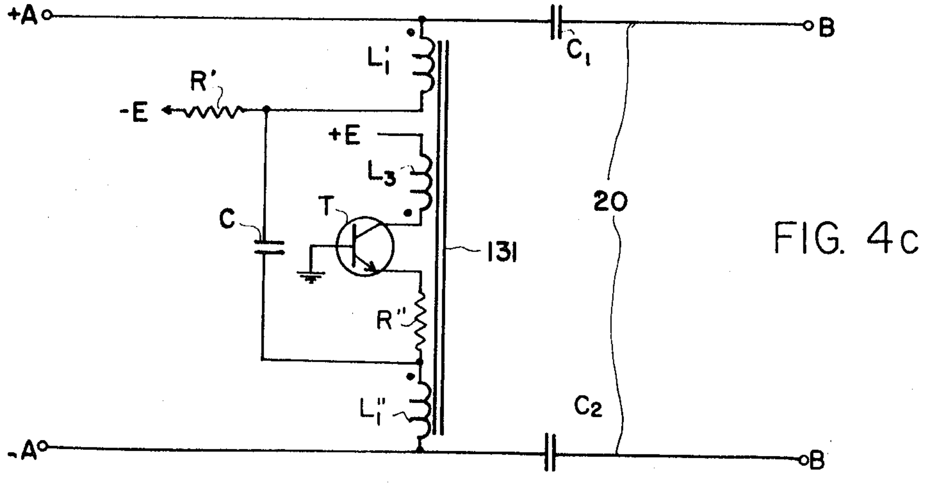

FIG. 4*c* shows a modification, similar to that of FIG. 4*b*, of the system illustrated in FIG. 2*a*.

In FIG. 1*a* I have shown an incoming line 10 and an outgoing line 20 interconnected for voice-frequency transmission by a transformer 30 having a primary winding, split into two halves $L_1'$, $L_1''$, and a secondary winding $L_2$ on a common core 31. Line 10 originates at a pair of subscriber terminals A whereas line 20 extends to a pair of remote terminals B. Two resistors R′ and R″, which may include switches and other loads responsive to direct current, are inserted between a negative terminal −E and a positive terminal (ground) of a DC power supply. A capacitor C is connected between the junction 11 of resistor R′ with winding $L_1'$ and the junction 12 of resistor R″ with winding $L_1''$.

Upon closure of the line loop at the subscriber station connected across terminals A, current flows in an aiding sense through windings $L_1'$ and L″ so as to magnetize the core 31 of transformer 30. In the absence of the precautions mentioned above, this current flow could lead to saturation of the core with resultant distortion and/or severe attenuation of voice-frequency signals transmitted from line 10 to line 20 or vice versa.

FIG. 1*b* shows the equivalent circuit of the conventional coupling network illustrated in FIG. 1*a*. This equivalent circuit is essentially a high-pass filter with its capacitive series arm C bridged by a resistance R representing the sum of resistances R′ and R″. Shunt impedance L represents the equivalent inductance of transformer 30.

From network theory the response characteristic of this filter, in terms of the coercive force H (proportional to the primary current) as a function of the complex frequency $s = \alpha + j\omega$, is found to satisfy the relationship $$H(s) = (s^2 + as + b)/s(s + c)$$

where *a*, *b* and *c* are constants determined by the circuit parameters, with $c = 1/RC$. This function has a pole at $s = -c$ which lies on the real axis ($\omega = 0$) of the phase-plane diagram and which impairs the low-frequency cutoff of the filter. Though direct current cannot pass the transformer 30, contrary to the showing of a direct conductive connection between terminals A and B in the simplified diagram of FIG. 1*b*, resistor R nevertheless constitutes a leakage path for low-frequency switching signals and the like.

The system of FIG. 2*a* effectively eliminates this leakage path by the introduction of a transistor T, here shown to be of the NPN type, which acts as a generator of a current $I_r$ equaling the current that traverses the resistance R in the equivalent diagram of FIG. 2*b*. Transistor T has its emitter connected to the junction 12 of capacitor C with winding $L_1''$ through resistor R″ and has its collector connected to a positive battery terminal +E through a tertiary winding $L_3$ on transformer core 31. As indicated by the dots in FIG. 2*a*, primary inductance $L_1'$, $L_1''$ and compensating inductance $L_3$ are wound on the core in opposed relationship so that, if the base current of transistor T is neglected, the magnetizing effects of these inductances balance each other if the number of turns of coil $L_3$ equals the combined number of turns of windings $L_1'$ and $L_1''$. The base of transistor T is connected to a point, here ground, having a potential intermediate those of terminals −E and +E.

Since the generator T (FIG. 2*b*) represents a perfect sink for the current $I_r$ passing through the resistance R, no part of this current will reach the terminals B so that the filter may be reduced to the simplified diagram of FIG. 2*c* with replacement of impedances C and L by a capacitance $C_o$ and an inductance $L_o$. This corresponds to a characteristic $$H(s) = (s^2 + a_o s + b_o)/s^2$$

which no longer has the aforementioned pole and which therefore presents a sharper cutoff at the lower limit of the transmitted frequency band.

It will be noted that transistor T lies effectively in series with resistors R′, R″, winding $L_3$ and DC source −E, +E between junctions 11 and 12, thus across condenser C. With its base potential fixed, transistor T will respond to any variation in the potential of junction 12 (due to voice-frequency signals arriving over either line 10, 20) by an increase or a reduction of the current flow therethrough, thus amplifying the impressed signal. Resistor R″, connected to the emitter of transistor T, has a certain negative-feedback effect upon the operation of the transistor as a signal amplifier.

The system of FIG. 3 differs from that of FIG. 2*a* in that the collector of transistor T is connected through winding $L_3$ to ground which, as in FIG. 1*a*, represents the positive terminal of the DC source. A voltage divider $R_a$, $R_b$ extends between junction 12 and ground, the base of transistor T being connected to a tap on this divider. Resistors R' and R'' of FIG. 2*a* have been replaced by a load resistor R connected to junction 11 and a feedback resistor $R_e$ between junction 12 and the emitter of the transistor. In this instance, for proper compensation of the biasing flow through the primary inductance $L_1'$, $L_1''$, the number of turns of winding $L_3$ must be greater than that of windings $L_1'$ and $L_1''$ combined since the latter windings will also be traversed by current flowing from ground through resistors $R_a$, $R_b$, terminals A and resistor R to terminal −E without passing through winding $L_3$. As in the previous embodiment, transistor T lies between junctions 11 and 12 in series with resistances R, $R_e$, winding $L_3$ and battery.

FIG. 4*a* shows a coupling circuit in which the line loop 10 receives direct current from terminals +A and −A so that no separate current source need be provided at the repeater. Voltage divider $R_a$, $R_b$ is therefore connected directly across junctions 11 and 12, in parallel with capacitor C and with a signal path including winding $L_3$, transistor T and resistor $R_e$ in series. As in FIG. 3, the conductance of the transistor in the absence of an impressed AC signal depends on the relative magnitude of resistors $R_a$ and $R_b$.

The circuit arrangement of FIG. 4*b* is similar to that of FIG. 4*a* except that line 20 is connected directly to line 10 through a pair of coupling condensers $C_1$, $C_2$ with omission of secondary winding $L_2$. Thus, transformer 30 has been reduced to a choke 130 with a core 131 similar to core 31 of the preceding Figures.

FIG. 4*c*, finally, represents a system derived from that of FIG. 2*a* with the modification just described, i.e. with replacement of secondary winding $L_2$ by a pair of coupling condensers $C_1$ and $C_2$.

Although the invention has been particularly disclosed wit reference to a repeater for a telecommunication system, it will be apparent that its principles are also applicable to other circuits wherein an inductance core is subject to magnetization by a constant or intermittent unidirectional current flow.

I claim

1. A signal-amplifying system comprising a first circuit and a second circuit reactively coupled to said first circuit, a terminal network in said first circuit at the junction thereof with said second circuit, said network including inductance means on a core and resistance means in series with at least part of said inductance means, transistor means in said network with input electrodes connected across at least a portion of said resistance means, and a compensating winding on said core serially connected to said transistor means for energization thereby in opposing relationship with said inductance means to balance the magnetizing effect of a direct current supplied through said inductance means to said resistance means; said inductance means including a coil split into two halves, said transistor means being connected between said halves in series with a source of direct current.

2. A system as defined in claim 1 wherein said halves constitute a primary winding of a coupling transformer having a secondary winding in said second circuit.

3. A system as defined in claim 1 wherein said second circuit includes condenser means capacitively coupling same to opposite ends of said coil.

4. A system as defined in claim 1, further comprising capacitor means inserted between said halves, said resistance means lying in a shunt path bridging said capacitor means.

5. A system as defined in claim 4 wherein said transistor means, said compensating winding and said source are connected in said shunt path in series with said resistance means.

6. A system as defined in claim 4 wherein said transistor means and said compensating winding are connected across said resistance means and said capacitor means.

7. A system as defined in claim 1 wherein said transistor means has a collector connected to said compensating winding and an emitter connected to one of said halves.

8. A system as defined in claim 7, further comprising a feedback resistor inserted between said emitter and said one of said halves.

9. A system as defined in claim 8 wherein said resistance means forms a voltage divider across said capacitor means, said transistor means having a base connected to a tap on said voltage divider.

* * * * *